E. E. ELLIS.
MOWING MACHINE.
APPLICATION FILED DEC. 30, 1918.
1,326,256.
Patented Dec. 30, 1919.
2 SHEETS—SHEET 1.
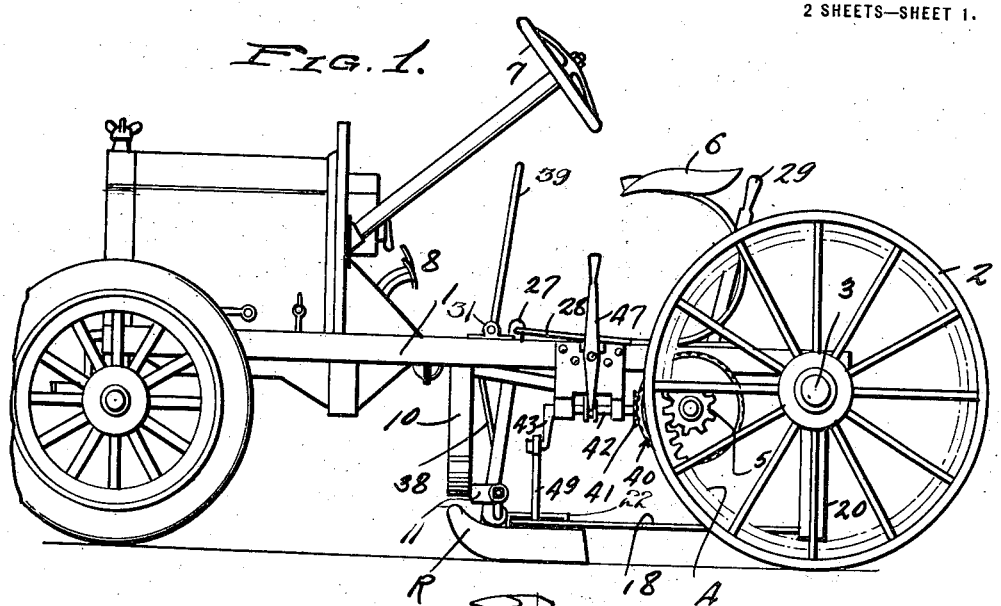
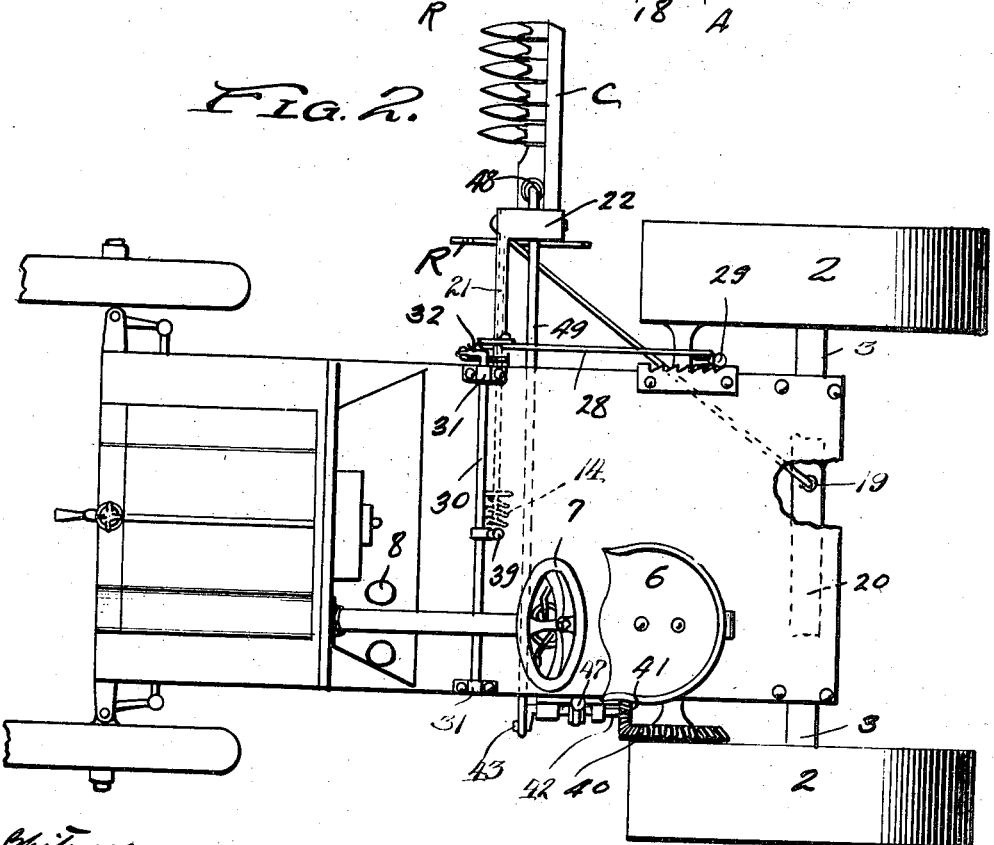

E. E. ELLIS.
MOWING MACHINE.
APPLICATION FILED DEC. 30, 1918.

1,326,256.

Patented Dec. 30, 1919.
2 SHEETS—SHEET 2.

Inventor
Elmer E. Ellis

Attorney

UNITED STATES PATENT OFFICE.

ELMER E. ELLIS, OF POMONA, CALIFORNIA.

MOWING-MACHINE.

1,326,256.　　　Specification of Letters Patent.　　Patented Dec. 30, 1919.

Application filed December 30, 1918. Serial No. 268,795.

*To all whom it may concern:*

Be it known that I, ELMER E. ELLIS, a citizen of the United States, residing at Pomona, in the county of Los Angeles and State of California, have invented certain new and useful Improvements in Mowing-Machines, of which the following is a specification.

This invention relates to harvesters, and more especially to mowing machines; and the object of the same is to produce a light, serviceable, and strong apparatus of this kind which may be attached to and driven by a light automobile whose framework is slightly adapted thereto.

Further objects are to provide all the necessary adjustments for the cutter bar, and manual controls therefor standing within reach of the driver.

Details are set forth in the following specification and attention is invited to the drawings herewith in which—

Figure 3:
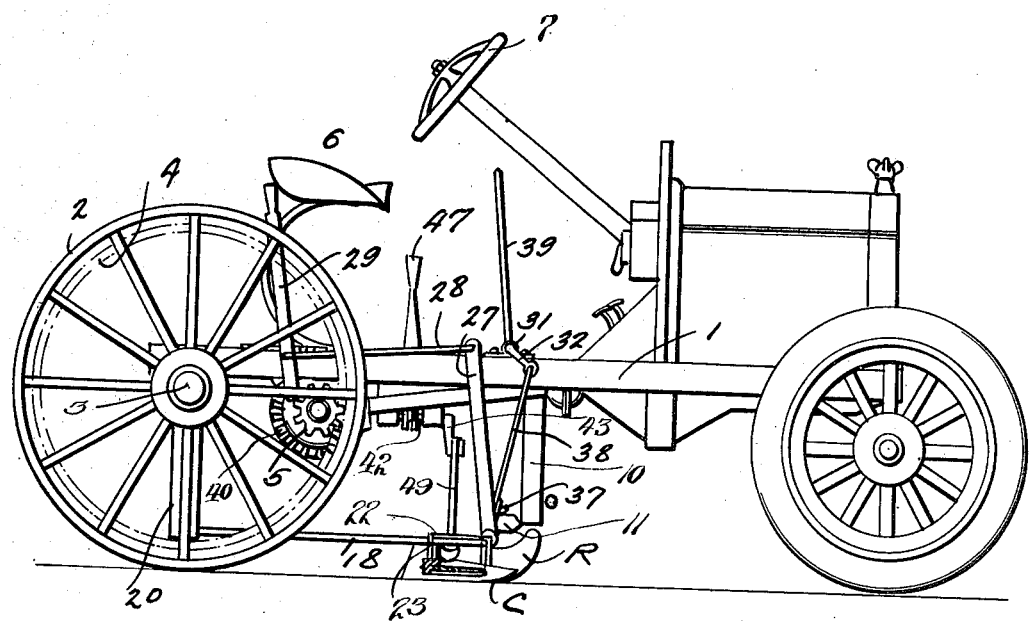

Figure 1 is a left side elevation of this machine complete; Fig. 2 is a plan view Fig. 3 a right side elevation, and Fig. 4 a perspective detail of certain parts.

We are concerned only with the running gear, framework and engine of the automobile, including such details as are necessary and are shown in the drawings but need no description here. The frame bars 1 are extended to the rear of the differential and the rear axle of the ordinary machine, and the rear wheels 2 are mounted on stud shafts under the corners of the frame as seen at 3. Instead of wheels having tires, I prefer metal wheels with rather broad rims and each may have a toothed ring 4 therein, while pinions 5 are secured to the extremities of the shaft which extends through the differential so that the main wheels can be driven from the automobile engine by power applied to their rims rather than power applied to their hubs. The controls for the engine and transmission need not be amplified in the drawings or specification, but obviously they control the stopping and starting of the machine and speed of progress. The driver sits on the seat 6 and steers by means of the wheel 7, while by means of pedals 8, the engine may be controlled.

Figure 4:
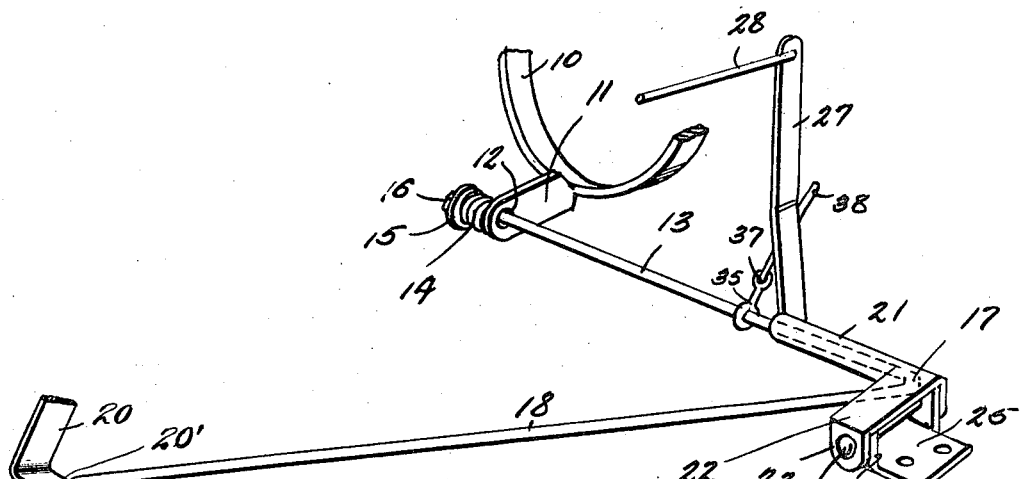

A hanger 10 depends from the center of the frame 1 and has at its bottom a rearwardly projecting ear 11 pierced with an eye 12. Through this eye passes loosely the front bar 13 of a V-shaped support, this bar passing through a spring 14 and washer 15 and receiving a nut 16 at its inner end as seen in Fig. 4. At its outer end the bar makes an acute angle at 17, whence it extends obliquely to the rear as at 18 and is loosely linked as at 19 into an eye 20' upstanding from a rear hanger 20 depending from the rear portion of the frame.

Loosely mounted on the front bar 13 is a sleeve 21 having at its outer end a head 22 provided with depending ears 23, and between the latter are mounted ears 24 upstanding from a hinge leaf 25 upon which latter is secured the inner end of the cutting apparatus C; a pin 26 passing through the four ears to pivotally connect said apparatus with the head. The latter in turn is integral with the sleeve which is pivotally mounted on the front bar 13 of the V-shaped support. Upstanding rigidly from the inner end of this sleeve is an arm 27 whose upper end is connected by a link 28 with a lever 29 as shown, and by settting this lever properly, the sleeve and therefore the cuttting apparatus can be rocked so as to adjust the angle of the teeth and the sickle bar to the ground level. Under ordinary circumstances the V-shaped support and the hinge carry the sickle bar at right angles to the length of the automobile, but if said cutting apparatus should strike a stone or stump or other obstruction or should encounter more difficult work than usual, it is clear that it might yield to the rear slightly, the front bar 13 drawing through the eye 12 as the spring 14 compresses. Adjustment of the entire cutting apparatus, so that its runner R may travel upon the ground or so that it may be raised entirely above the same, is effected as follows:—

A rock shaft 30 is mounted in bearings 31 on the frame and controlled by a hand lever 39. The right end of this shaft is cranked as shown at 32 and to the crank is connected a depending link 38 whose lower end is hooked at 37 to an eye 35 loosely surrounding the front bar 13 adjacent the arm 27 as perhaps best seen in Fig. 4. When the hand lever 39 is properly adjusted, the crank 32 draws on the link 38 and raises the bar 13, which movement is permitted by the size of the eye 12 in the ear 11 and by the loose engagement of the rear bar 18 at the point 19 with the rear hanger; and therefore, the outer end of the V-shaped support and all parts carried thereby are raised, as when the machine is to be driven through the field or from it, or along a roadway.

The sickle is reciprocated by the following devices: A bevel gear 40 on the transmission shaft meshes with a pinion 41 on the shaft 42 whose crank 43 at its front end is connected by a rod or link 49 with the sickle bar itself, the connection being preferably by means of a ball and socket joint as indicated at 48. The crank shaft 42 may have a clutch within its length, the same being indicated in Fig. 1 and controlled by a hand lever 47, and when this clutch is thrown open, the rotation of the crank ceases. When the clutch is closed reciprocating motion is imparted to the sickle bar as well understood. The ball and socket joint 48 permits the entire cutting apparatus C to be raised to a vertical position alongside the machine as well understood.

Thus is produced a mowing machine adapted to the chassis and driving mechanism of an ordinary automobile, which latter need be changed only to the extent that its body is removed and its frame is extended to the rear. I would prefer also to employ the broad tread wheels 2 with an internal gear ring of teeth 4 as first described above, although of course ordinary automobile wheels could also be used here if preferred.

The foregoing description and drawings have reference to the preferred form of my invention. It is to be understood that I may make certain changes in construction, arrangement and combination of parts, materials, dimensions, et cetera, as may prove expedient and fall within the scope of the appended claims.

Having thus fully described my invention, what I claim as new and desire to secure by Letters Patent is:—

1. In a mowing machine, the combination with an automobile chassis; of a hanger at its center having a perforated ear, a second hanger at its rear end, a V-shaped support whose rear bar is loosely linked to said rear hanger and whose front bar passes through said ear and carries a washer and a nut, a spring between the ear and washer, a sleeve rotatably mounted on the front bar of said support, mechanism for adjusting the position of said sleeve, means for supporting the cutting apparatus from the sleeve, and means for driving said apparatus.

2. In a mowing machine, the combination with an automobile chassis; of a hanger at its center having a perforated ear, a second hanger at its rear end, a V-shaped support whose rear bar is loosely linked to said rear hanger and whose front bar passes through said ear and carries a washer and nut, a spring between the ear and washer, means for sustaining and adjusting the position of the angular end of said support, and a cutting apparatus carried by this end.

3. In a mowing machine, the combination with an automobile chassis; of a hanger at its center having a perforated ear, a second hanger at its rear end, a V-shaped support whose rear bar is loosely linked to said rear hanger and whose front bar passes through said ear and carries a washer and nut, a spring between the ear and washer, a sleeve rotatably mounted on the front bar of said support and having an upstanding arm, lever mechanism for adjusting the position of said arm, means for supporting the cutting apparatus from the outer end of said sleeve, means for driving said apparatus, and lever mechanism for adjusting the height of the outer end of the support and sleeve and mechanism.

4. In a mowing machine, the combination with an automobile chassis, a V-shaped support mounted at its ends beneath the same and with its angle projecting to one side thereof, and means for adjusting the position of the projecting portion vertically; of a sleeve rotatably mounted on one bar of said support and having an upstanding arm, a head at the outer end of said sleeve, a cutting apparatus hinged to said head, means for adjusting the position of said arm to rotate the sleeve on said bar, and driving mechanism for the sickle bar of said apparatus.

5. In a mowing machine, the combination with an automobile chassis, a support carried thereby and projecting to one side thereof, a sleeve rotatably mounted on the support and having at its outer end a head with downturned ears, an upstanding arm on the sleeve, and means for adjusting the arm and the position of the sleeve on the support; of a hinge leaf having upstanding ears passing between those mentioned, a pivot pin through all ears, the cutting apparatus carried by said sleeve, means for driving the sickle bar thereof, and means for adjusting the vertical position of said head.

In testimony whereof I affix my signature in presence of two witnesses.

ELMER E. ELLIS.

Witnesses:
JESSE P. EDMONDS,
A. H. LAWRENCE.